UNITED STATES PATENT OFFICE.

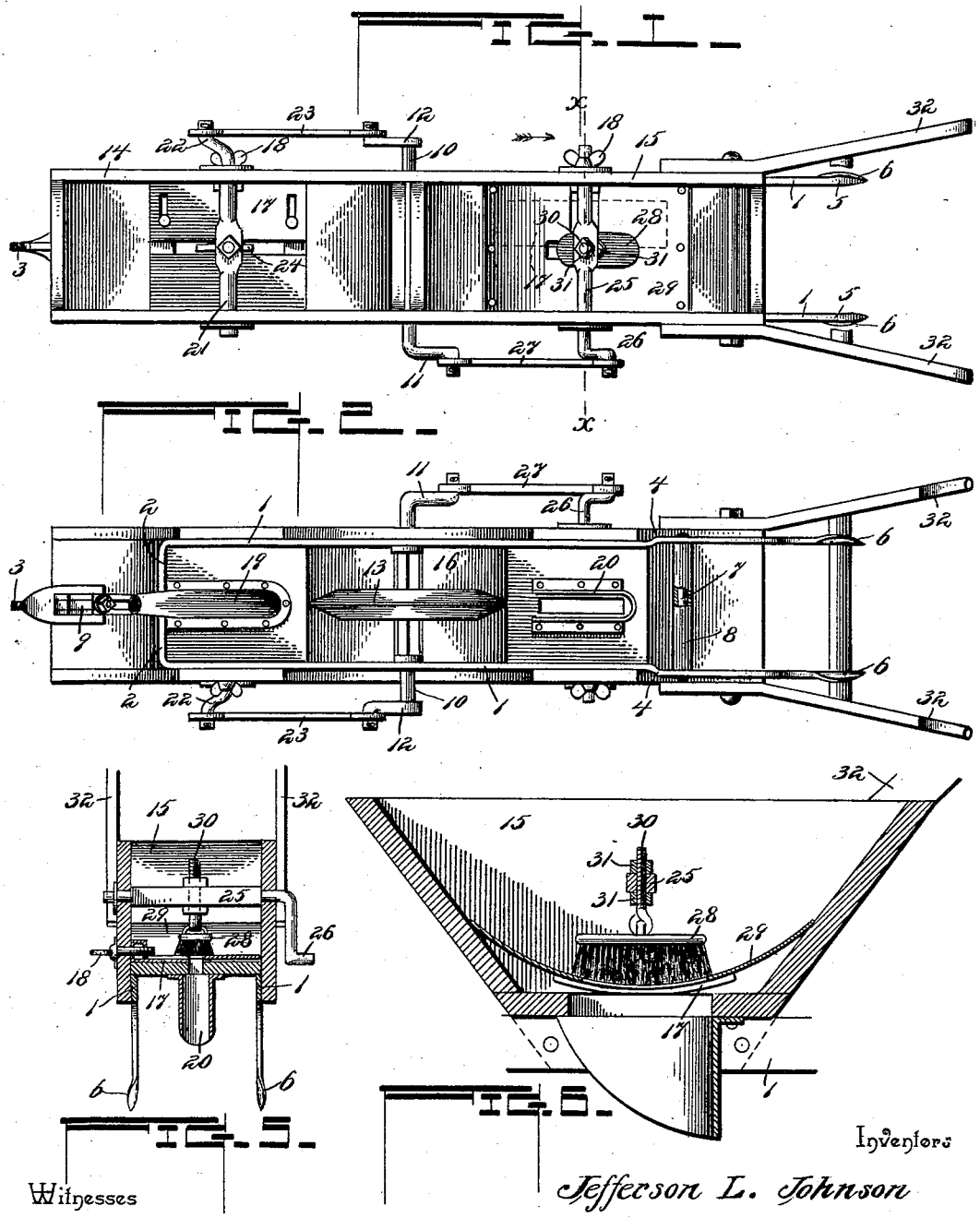

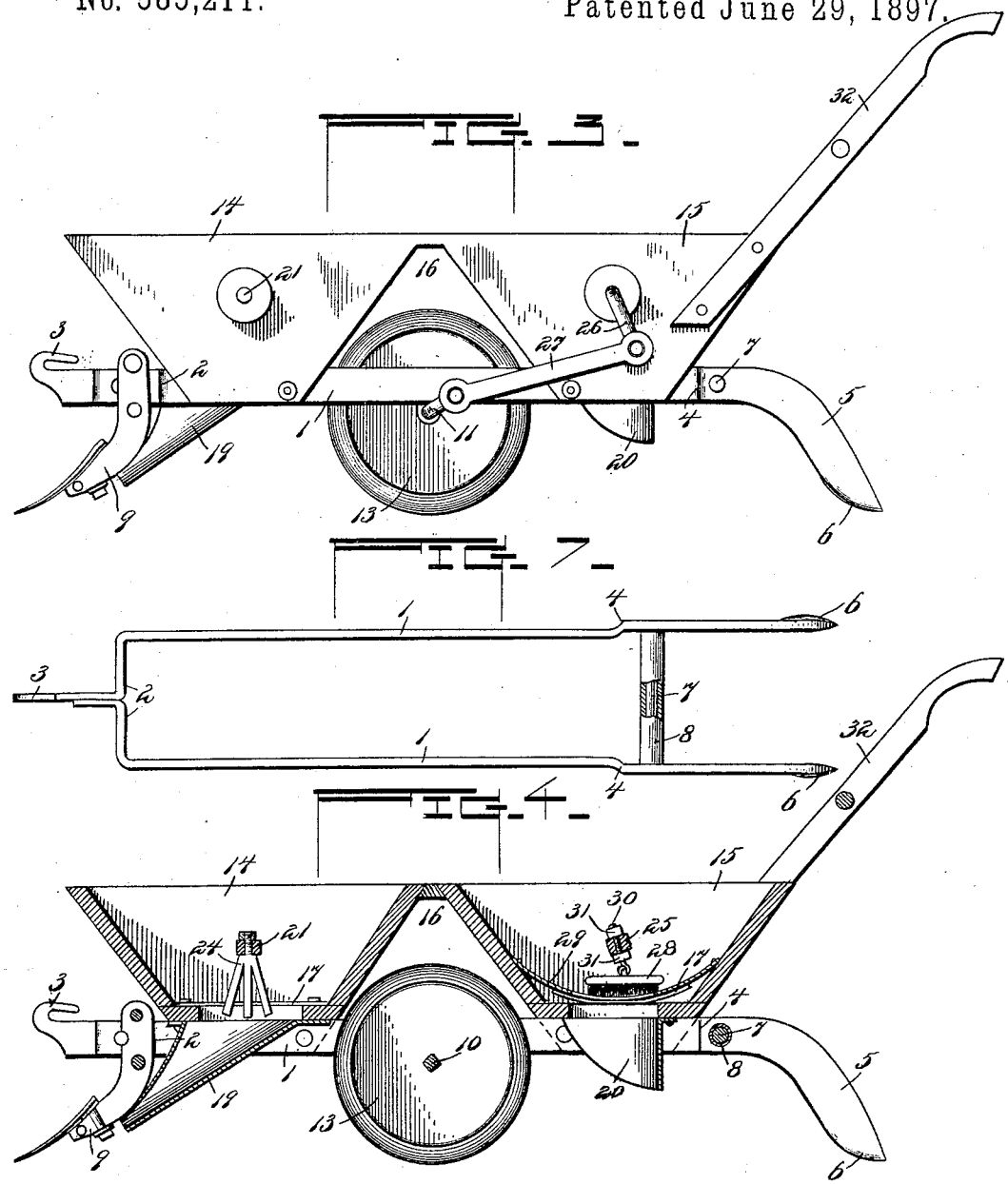

JEFFERSON L. JOHNSON AND JOSEPH B. SMITH, OF SUMMERVILLE, GEORGIA.

PLANTER.

SPECIFICATION forming part of Letters Patent No. 585,211, dated June 29, 1897.

Application filed February 19, 1897. Serial No. 624,168. (No model.)

*To all whom it may concern:*

Be it known that we, JEFFERSON L. JOHNSON and JOSEPH B. SMITH, citizens of the United States, residing at Summerville, in the county of Chattooga and State of Georgia, have invented a new and useful Planter, of which the following is a specification.

This invention relates to machines for sowing seed and distributing a fertilizer; and the purpose of the improvement is to devise an implement for dropping different kinds of seed and which can be regulated for sowing any required quantity to the acre.

The improvement relates more particularly to the general construction of the machine, whereby its efficiency and durability are increased as compared with similar implements for a like purpose and whereby the operating parts and the number of joints are reduced to the fewest number possible consistent with strength and the work required of the machine.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan of a planter constructed in accordance with this invention. Fig. 2 is a view of the planter inverted. Fig. 3 is a side elevation. Fig. 4 is a central longitudinal section. Fig. 5 is a transverse section on the line X X of Fig. 1, looking to the rear. Fig. 6 is a longitudinal section of the seeding-hopper on a larger scale. Fig. 7 is a detail view of the frame.

Corresponding and like parts are referred to in the following description and indicated in the several views of the accompanying drawings by the same reference-characters.

The frame consists of longitudinal bars 1, having their front ends bent inward, as shown at 2, thence forward and secured together, one of the forward ends being extended beyond the other and bent to provide a clevis 3. The rear portions of the longitudinal bars 1 are offset, as shown at 4, and are curved downwardly, as shown at 5, to provide coverers and ridgers, the lower ends of the curved parts 5 being sharpened at their front edges and outwardly deflected, as shown at 6, to engage with the loose soil at the sides of the furrow and form it into a ridge. The front edges of the blade portions 6 are curved rearwardly, so as to penetrate the soil more readily and shape it up into the required form. A rod or bolt 7 connects the rear portions of the bars 1 and receives a sleeve 8, which is mounted thereon and engages at its ends with the inner sides of the bars 1, so as to hold them at a fixed distance apart. An opener 9, of desired construction, is located at the front end of the frame and is secured to the forwardly-bent portions of the longitudinal bars 1. An axle 10 is journaled in bearings provided midway of the ends of the bars 1 and has cranks 11 and 12 at its extremities, and a ground-wheel 13 is mounted upon the axle, so as to rotate therewith, and is in line with the opener, so as to operate in the furrow.

Similarly-formed hoppers 14 and 15 are mounted upon the frame and comprise parallel side pieces and oppositely-inclined end pieces, and these hoppers are arranged the one in front of the other, and the inverted-V space 16, formed between the adjacent end portions thereof, provides clearance for the upper portion of the ground-wheel 13 and forms a housing therefor, thereby enabling the machine to be of a minimum length compared with the size and capacity of the hoppers. The side pieces of the hoppers are extended below their bottoms and embrace the sides of the longitudinal bars 1, to which they are firmly and rigidly attached, thereby resulting in a substantial structure. The discharge-openings provided in the bottoms of the hoppers are adapted to be regulated by means of slides 17 and set-screws 18, the latter operating through a side of the hoppers and engaging with a vertical extension of the slides, which is threaded to receive the set-screw coöperating therewith. The front hopper 14 is intended to receive guano or other fertilizer, and the rear hopper contains the seed to be planted, but it is obvious that the seed may be placed in the front hopper and the fertilizer in the rear hopper, if desired. A spout 19 is applied to the front hopper to conduct the fertilizer or contents thereof into the furrow provided by the opener, and a casing 20 is applied to the rear hopper and is open at its front side and serves to prevent the scattering of the seed when the planter is in operation.

A shaft 21 is journaled in the sides of the front hopper and has one end extended and terminating in a crank 22, which is connected by means of a pitman 23 with the crank 12. An agitator or force-feeder 24 has connection with the shaft 21 and insures a proper distribution of the fertilizer and a delivery thereof through the discharge-opening as the machine is impelled over the field. A shaft 25 is journaled in the sides of the rear hopper, and one end is provided with a crank 26, which is connected by means of a pitman 27 with the crank 11, and this shaft may be supplied with an agitator similar to that fitted to the shaft 21 or may have a brush 28 connected therewith, the latter sweeping over a false bottom 29, which is curved longitudinally to approximate the sweep of the brush, the latter sweeping such seed as corn, peas, &c., through the opening formed in the false bottom, which opening corresponds with the discharge-opening in the bottom of the hopper and is controlled by the slide interposed between the main and false bottoms. A stem 30 has adjustable connection with the shaft 25 and is threaded throughout its length and receives adjusting-nuts 31, which are located above and below the shaft 25, so that by a proper manipulation thereof the stem will be moved so as to vary the position of the brush with reference to the false bottom. A loose connection is formed between the brush and its carrying-stem, and, as shown, the lower or inner end of the stem is bent into an eye which receives an eye or staple applied to the back of the brush, thereby permitting the latter to swing independently of its vibrating movement with the stem. As the brush wears, the stem can be adjusted so as to preserve the proper distance between the tufts of the brush and the curved bottom over which it operates.

Handles 32 are applied to the rear hopper and enable the attendant to direct the movements of the machine as the latter is drawn over the field. When in operation, the draft is applied to the clevis 3, and as the machine is drawn over the field the traction of the ground-wheel 13 will cause it to rotate and through the connections herein described impart a rocking movement to the shafts 21 and 25 and the agitators or force-feeders carried thereby, whereby a delivery of the fertilizer and seed is insured. The fertilizer is deposited in the furrow, and the earth falling thereover is compressed by the wheel 13, and the seed delivered into the same furrow is covered by the blades 6, which latter also form the ridge.

Having thus described the invention, what is claimed as new is—

1. In a planter, the combination of a frame, front and rear hoppers secured to the frame and having their inner or opposing end pieces oppositely inclined to form an inverted-V space, shafts journaled in the sides of the hoppers and provided with agitators, and a ground-wheel journaled to the frame and having connection with the said shafts, and having its upper portion operating and housed in the said V-space, substantially as set forth.

2. In a planter, the combination of longitudinal bars having their front ends bent inwardly, thence forwardly and secured together, and having their rear ends curved downwardly and terminating in blades, a bolt connecting the rear portions of the bars, a spacing-sleeve mounted upon the bolt to hold the rear portions of the bars a fixed distance apart, front and rear hoppers having their sides extended and embracing the outer sides of the longitudinal bars and secured thereto, and having their inner or opposing ends oppositely flared to provide an inverted-V space, shafts provided with agitators operating in the hoppers, and a ground-wheel for operating the shafts journaled to the longitudinal bars at an intermediate point and having its upper portion operating in the said V-space and housed and protected thereby, substantially as set forth.

3. In a planter, the combination with the hopper, and a rocking shaft, of a stem having adjustable connection with the shaft, and an agitator having loose connection with the stem, substantially as set forth.

4. In a planter, the combination of a hopper having a curved bottom provided with a discharge-opening, a rocking shaft, a stem, means for adjustably connecting the stem with the rocking shaft, and a brush having loose connection with the stem and adapted to sweep over the curved bottom of the hopper, substantially as described.

In testimony that we claim the foregoing as our own we have hereto affixed our signatures in the presence of two witnesses.

JEFFERSON L. JOHNSON.
JOSEPH B. SMITH.

Witnesses:
JNO. W. CAIN,
J. V. WHEELER.